United States Patent [19]
Bray

[11] 3,887,463
[45] June 3, 1975

[54] REVERSE OSMOSIS SYSTEM WITH AUTOMATIC VALVE FOR MODULE OPERATION CONTROL

[75] Inventor: Donald T. Bray, Escondido, Calif.
[73] Assignee: Desalination Systems, Inc., Escondido, Calif.
[22] Filed: Feb. 6, 1974
[21] Appl. No.: 439,868

[52] U.S. Cl. ................ 210/110; 210/110; 210/257; 210/258; 210/321; 210/433
[51] Int. Cl. ............................................. B01d 31/00
[58] Field of Search ....... 210/22, 23, 321, 433, 110, 210/257, 258, 116

[56] References Cited
UNITED STATES PATENTS
3,679,055 7/1972 Clark et al. ..................... 210/257 X
3,794,173 2/1974 Bray ................................ 210/321 X

*Primary Examiner*—Frank A. Spear, Jr.
*Attorney, Agent, or Firm*—Clement H. Allen

[57] ABSTRACT

A reverse osmosis system includes a pressurized purified water storage container and an automatic valve. The valve has a sealing member spanning a first internal cavity and movable responsive to the pressure of purified water in the storage container. A central internal cavity is of effective cross sectional area smaller than that of the first cavity spanned by a sealing member operatively connected to the member sealing the first cavity. A third cavity has an opening of cross sectional area smaller than the effective cross sectional area of the central cavity and leading to the central cavity which may be opened or shut off by a sealing member operatively connected to the sealing member in the central cavity. When the pressure in the storage container rises above a predetermined value, it acts through the sealing members in the first and central cavities to shut off the pressurized feed solution introduced into the third cavity from flowing through the opening of the third cavity into the second cavity and thence to the input of a semipermeable membrane-containing module. When the pressure in the storage container drops below a lower predetermined value, it acts through the sealing members in the first and central cavities to open the opening of the third cavity leading to the central cavity, thus restoring flow of feed solution through the central cavity and thence to the input of the semipermeable membrane-containing module.

7 Claims, 4 Drawing Figures

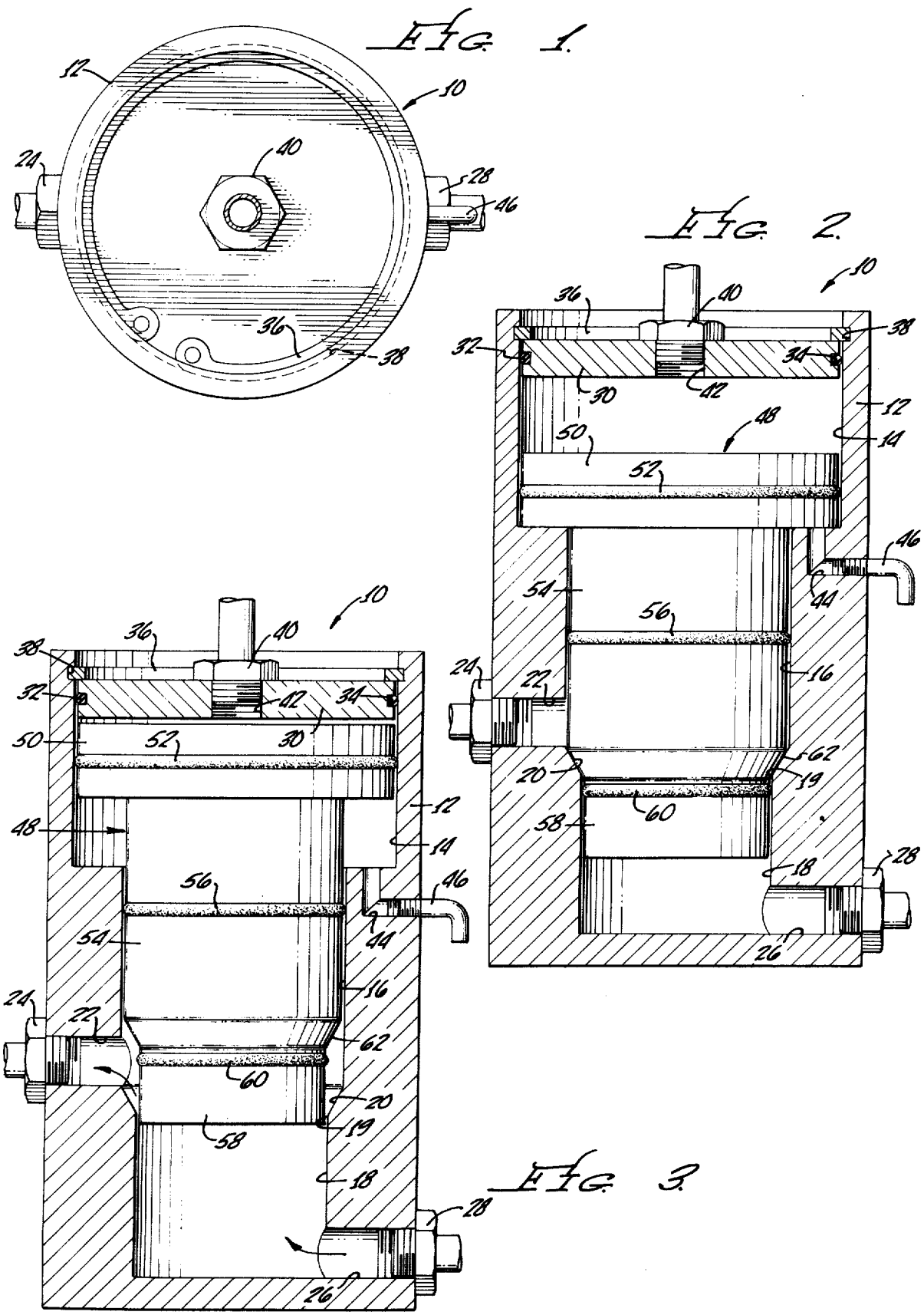

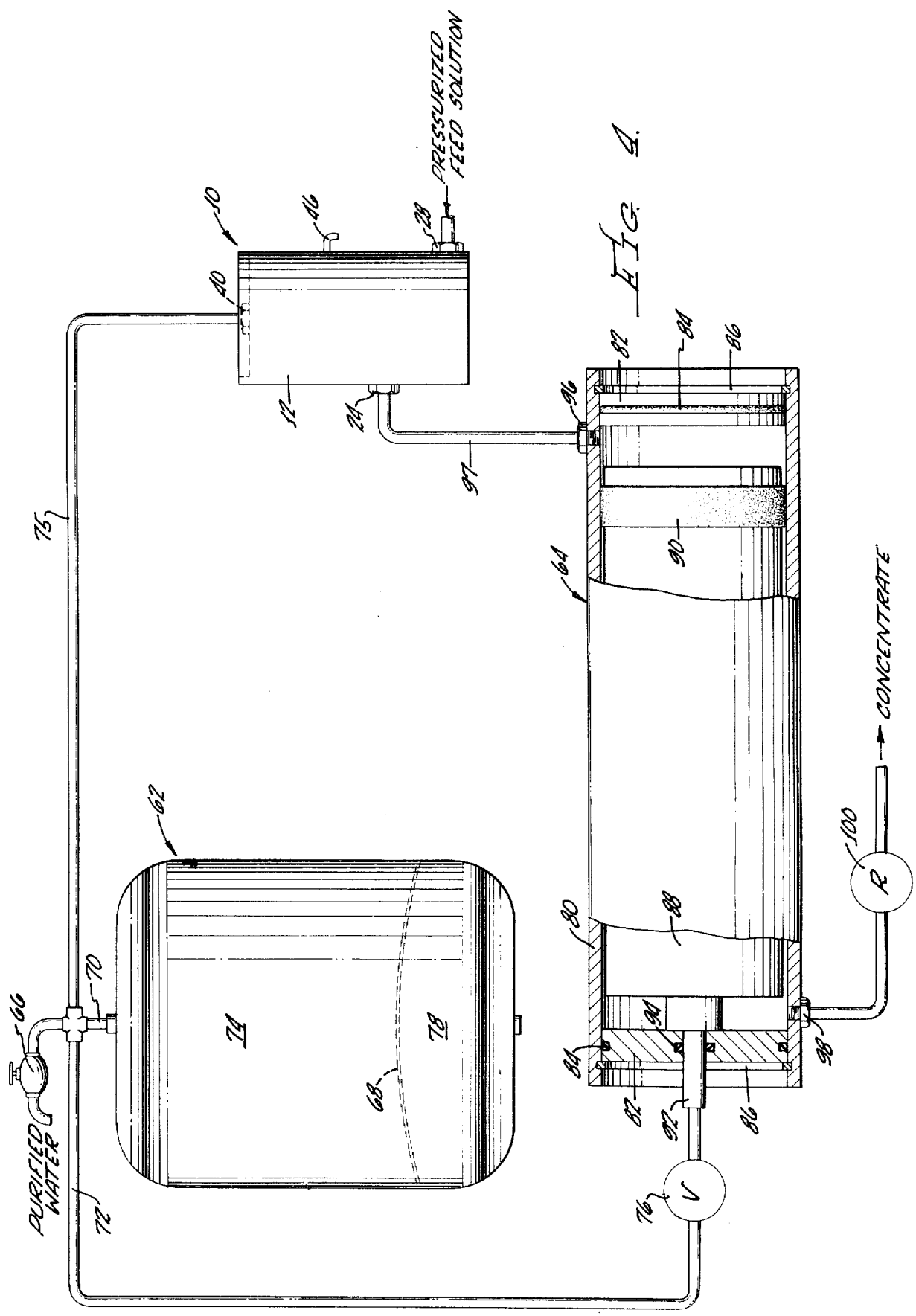

3,887,463

REVERSE OSMOSIS SYSTEM WITH AUTOMATIC VALVE FOR MODULE OPERATION CONTROL

BACKGROUND OF THE INVENTION

1. The Field of the Invention

This invention relates to a reverse osmosis system having an automatic valve to central operation of a semipermeable membrane-containing module supplying purified water to a pressurized water storage container.

2. The Prior Art

Reverse osmosis systems for supplying small amounts of purified water for home use have often employed a purified water storage container having a barrier such as an impermeable flexible diaphragm separating the purified water from a pressurizing fluid such as compressed air under relatively low pressure. As purified water is produced by a semipermeable membrane-containing module from pressurized feed water such as the household supply, it is introduced into the storage container and its pressure gradually rises (if it is not used) as more and more is produced and introduced. When the pressure of the purified water rises above a critical value, water must be released from the storage container to prevent further pressure rise so that adequate pressure differential across the membrane (that is between the feed water pressure and the purified water pressure) is maintained. Such release of purified water is wasteful and requires relatively expensive pressure controlled valves or equipment. Examples of such systems are disclosed in U.S. Pat. Nos. 3,493,496; 3,568,843; 3,542,199; and 3,726,793.

The referse osmosis system of this invention employs an automatic valve, responsive to the pressure of purified water in the storage container, to shut off and also to restore the flow of pressurized feed water to the semipermeable membrane-containing module, and thus avoid release and waste of purified water, to stretch out actual operating time of the module and to provide module flushing when feed solution flow is initially restored.

SUMMARY OF THE INVENTION

Summarized briefly, this invention comprises a reverse osmosis system in which purified water from a semipermeable membrane-containing module is stored in a container under fluctuating, elevated pressure. Pressurized feed water flow into the module is shut off by an automatic valve when the pressure in the storage container rises above a first predetermined value, and flow is restored by the automatic valve when pressure in the storage container drops below a second and lower pressure caused by withdrawal of purified water for use. The restoration or turn-on pressure is a predetermined proportion of the feed water pressure and the shut-off pressure is related to or a proportion of the turn-on pressure.

The automatic valve has a body with a first internal cavity; a central internal cavity of effective cross sectional area smaller than that of the first cavity; and a third internal cavity having an opening leading to the central cavity of area smaller than the effective cross sectional area of the central cavity. Movable seals span the effective cross sectional areas of the first and central cavities, the seal across the first cavity being operatively connected to the seal across the central cavity. A third movable seal operatively connected to the seal across the central cavity, opens the opening of the third cavity into communication with the central cavity when the pressure from the storage tank applied above the seal across the first cavity is below a predetermined pressure; and closes the opening of the third cavity from communication with the central cavity when the pressure applied above the seal across the first cavity is above a second and higher predetermined pressure. A connector in the valve body communicating with the first cavity above the movable seal spanning it is adapted to be connected to the interior of the purified water container; a connector communicating with the central cavity below the movable seal spanning is adapted to be connected to the feed solution input of the semipermeable membrane-containing module; and a connector communicating with the third cavity is adapted to be connected to the supply of feed solution at relatively high pressure. In a preferred embodiment, the valve body has its internal cavities in the form of three circular bores of decreasing diameter. A double step piston is slidable within the bores, with its one or top end forming a movable seal spanning the first and largest diameter bore; its central section of smaller diameter forming a movable seal spanning the central bore; and its other or lower end of an effective diameter to seal the opening of the third bore leading to the central bore. When the piston is moved downward by a first predetermined pressure against its top surface with its lower end sealing the third bore opening, the piston shuts off the flow of feed solution to the central cavity and thence to the semipermeable membrane-containing module. When the pressure against the small or bottom end of the piston creates sufficient force to overcome a second predetermined and lower pressure against the piston top, the piston moves upward to open the opening between the third and cental bores to restore flow of feed solution to the semipermeable membrane-containing module.

BRIEF DESCRIPTION OF THE DRAWINGS

In the drawings:

FIG. 1 shows a top view of a control valve embodying features of this invention.

FIG. 2 shows a central vertical section of the valve of FIG. 1 with the feed solution supply shut off.

FIG. 3 shows the same view as FIG. 2, with the feed solution supply open.

FIG. 4 shows a partly diagrammatic representation of the valve of FIG. 1 in a system including a module containing a semipermeable membrane cartridge, and a purified water storage container.

DESCRIPTION OF A PREFERRED EMBODIMENT

Referring particularly to FIGS. 1 to 3, the control valve 10 comprises a cylindrical body 12 having, near one end, a first internal cavity in the form of circular bore 14, a central internal cavity or circular bore 16 communicating with the lower part of bore 14 and being of smaller effective cross sectional area or diameter than bore 14, and a third internal cavity or circular bore 18 having an opening 19 of smaller effective cross sectional area of diameter than bore 16 and communicating with bore 16. The juncture of bores 16 and 18 may be formed as a tapered shoulder 20. Perforating body 12 and communicating with the lower part of bore 16 is conduit 22 into whose outer end may be threaded feed solution output connector 24. Also, perforating body 12 and communicating with the lower part of bore 18 is conduit 26 into whose outer end may be threaded feed solution input connector 28.

The top of first bore 14 in body 12 is closed as by plug 30, which is sealed to the inner side wall of bore 14 resilient O-ring 32 sealed in groove 34 in the outer edge of plug 30. Snap ring 36 seated in groove 38 in the inner side wall of bore 14 holds plug 30 in bore 14 against internal pressure from solution or liquid introduced thereinto. Connector 40 is threaded into conduit 42 through plug 30 to communicate with bore 14 inside body 12; connector 40 is adapted to connect the top of upper bore 14 with a storage container for purified water, as hereinafter explained in detail.

The bottom portion of bore 14 communicates with vent conduit 44, for example as shown through the shoulder between it and bore 16; a vent tube outlet 46 being threaded into the outer end of conduit 44.

Floating so that it may move up and down in bores 14, 16 and 18 is a unitary double step piston 48 having a top or large end 50 of diameter slightly smaller than the diameter of first bore 14 and to which it is slidably sealed as by resilient 0-ring 52 seated in a conventional circumferential groove around its outer edge. The central section 54 of step piston 48 is of diameter slightly smaller than the diameter of central bore 16 and to which it is slidably sealed as by resilient O-ring 56 seated in a conventional circumferential groove around its outer edge. The lower or small end 58 of step piston 48 is of diameter slightly smaller than lower bore 18 and to which it may be slidably sealed as by resilient O-ring 60 seated in a conventional circumferential groove around its outer edge. The juncture of central portion 54 and lower portion 58 of step piston 48 is formed as a tapering end 62 with degree of taper roughly corresponding to the taper of shoulder 20 between bores 16 and 18. When step piston 48 is in lower position as seen in FIG. 1, piston tapering end 62 will rest on bore shoulder 20, with O-ring 60 sealing lower piston end 58 to the openng 19 of bore 18 and shutting off communication and flow of solution from connector 28 through conduit 26 and lower bore 18, to central bore 16, conduit 22 and connector 24. When step piston 48 is in raised or upper position as seen in FIG. 3, resilient O-ring 60 is raised up and out of bore 18, thus providing communication and restoring flow of solution from connector 28 through conduit 26 and lower bore 18, through the aperture between shoulders 62 and 20, which are now separated, and thus to central bore 16, conduit 22 and connector 24.

Referring now to FIG. 4, a reverse osmosis system is illustrated in which a control valve 10 of the type described and illustrated in FIGS. 1 to 3 is employed. This system includes a storage tank 62 of the type in which purified water delivered from a reverse osmosis module 64 is maintained under pressure for delivery to dispersing means such as faucet or spigot 66. Storage tank 62 may be of the type in which a flexible, impervious diaphragm 68 separates the interior of the tank into two compartments. Purified water from module 64 is introduced through lines 70 and 72 from module 64 into the top compartment 74 of storage tank 62, check valve 76 being placed in line 72 to prevent any back flow of purified water back into module 64 under any conditions of pressure relationship. The bottom compartment 78 of storage tank 62 is filled with fluid such as air under slight initial pressure, which will maintain through diaphragm 68, delivery pressure of desired magnitude in purified water stored in top compartment 74, this pressure being communicated by line 75 connecting the purified water compartment 74 through line 70 to connector 40 at the top of valve 10. Storage tanks of this general design are described in more detail in U.S. Pat. Nos. 3,568,843; 3,452,199; and 3,493,496, referred to hereinbefore.

Semipermeable membrane module 64 may be of a commercially available type having a pressure resistant container 80 closed at each end by plugs 82 sealed to the adjacent container walls by resilient O-rings 84 and maintained in position against internal pressure by snap rings 86 in grooves in the pressure resistant container wall. Inside pressure resistant container 80 is semipermeable membrane cartridge 88 of well-known spiral wound type of which examples are shown in U.S. pat. Nos. 3,367,504; 3,397,790; and 3,568,843, among others. Cartridge 88 is sealed to the inner wall of pressure resistant container 8 by circumferential seal 90. Purified water delivery tube 92 projecting from one end of cartridge 88 passes through one of end plugs 82 through a perforation therein, being sealed thereto by resilient O-ring 94. Feed solution inlet 96 in pressure resistant container 80 supplies feed solution from line 97 to one end of cartridge 88 and brine or concentrate outlet 98 communicates with the other end of cartridge 88 to provide for release of brine or concentrate after the feed solution has passed longitudinally through cartridge 88 and purified water which has passed through the semipermeable membrane has been delivered through tube 92. Concentrate outlet 98 is connected to a restrictor 100 through which a small flow of concentrate may flow while maintaining suitable high operating pressure within pressure resistant container 86. Restrictor 100 may be in the form of a restricted orifice, a length of small diameter tubing, a back pressure control valve of commercial type, or other equivalent device as will be apparent to those skilled in the art.

Preferably, the relationship of the areas of the cavities in the control valve and the cross sectional areas of the seals spanning them should be as follows: The cross sectional area of the central cavity and its seal is from one-third to two-thirds, the area of the cross sectional area of the first or largest cavity and its seal, and the cross sectional area of the opening from the third or smallest cavity into the central cavity is from one-half to slightly less than the cross sectional area of the central cavity and its seal. An advantageous ratio is 10 to 5 to 4, that is a relationship in which the cross sectional area of the central cavity is about one-half that of the first or largest cavity and the cross sectional area of the opening from the third or smallest cavity is about four-fifths that of the central cavity.

In operation, the effective cross sectional areas of the bores 14 and 16 and the opening 19 to bore 18 will have been chosen to provide the required areas which, when the appropriate pressures are applied thereto, will provide force to move piston 48 to open or close the valve, that is to shut off or restore feed solution flow from connector 24 to module 64. For example, it may be desired to shut off feed solution supply to module 64 when the purified water pressure in line 75 exceeds a first predetermined pressure of 50 psi and to restore flow of feed solution to module 64 when the pressure in line 75 has dropped below a second predetermined pressure of 40 psi caused by withdrawal of purified water from storage tank 62 through faucet 66. Assume a feed solution supply pressure of 100 psi. Under these conditions, the effective cross sectional area of bore 14, and the corresponding surface area including O-ring 52 of the top surface of piston 48 could be one square inch, the effective area of opening 19 to be sealed by the bottom section of piston 48 would be 0.4 square inch and the effective cross sectional area of central cavity 16 and the corresponding cross sectional area of the central section of piston 48 with its O-ring 56 would be 0.5 square inch. With these related dimensions, when the pressure in line 75 (essentially the pressure of the purified water in the top portion 74 of storage tank 62) exceeds 50 psi, then piston 48 would be moved downward by the force exerted on its top, which would amount to 50 psi over an area of 1 square inch or 50 pounds to shut off feed solution flow. When the pressure in line 75 and on top of piston 48 drops to less than 40 psi, then the force exerted on the bottom of piston 48 through opening 19 of 40 pounds (a 0.4 inch area times 100 psi feed liquid pressure) would exceed the less than 40 pounds now exerted on the top of piston 48 and piston 48 would move upward to open opening 19 to restore flow of feed solution from connector 28 through opening 19, conduit 22 and line 97 to inlet 96 of module 64. As soon as valve 10 is opened, the line pressure, 100 psi, is exerted now against the greater cross sectional area of central bore 16 and an upward force of 50 pounds on piston 48 results. A pressure of over 50 psi acting against the effective top surface area of piston 48 is required to again move piston downward to close opening 19 and valve 10 to shut off the feed solution supply to module 64. Therefore, the system operates with valve 10 maintaining a pressure of purified water in storage tank 62 between slightly less than 40 psi and slightly greater than 50 psi, with minimum pressure swings from 50 psi to 40 psi and back. This prevents undue opening and closing of the valve under small pressure changes, while still maintaining a pressure lag so that the turn-on pressure is less than the turn-off pressure.

When valve 10 closes at above 50 psi storage tank pressure and shuts off feed solution to module 64, no additional purified water is produced by reverse osmosis module 64 to replace any used from storage tank 62 by opening faucet 66 until the pressure in storage tank 62 has dropped below 40 psi. Then valve 10 opens again as has been described to restore feed solution flow to module 64 and this on-off cycle is repeated as the pressure in storage tank 62 fluctuates between pressures of 50 psi to 40 psi or less. The pressure lag, in this case 10 psi, between opening and closing of valve 10 is of utmost importance. It provides a suitable turn-on pressure, in this case 40 psi, below which the pressure of purified water in storage tank 62 will be insufficient for adequate or desired pressurization of the purified water supplied as from faucet 66. As the reverse osmosis module 64 operates when feed solution is supplied thereby by open valve 10, purified water is produced and introduced into storage tank 62 through line 72 and 70 under pressure which will gradually rise in compartment 74 of storage tank 62, due to the compression of the gas in compartment 78 and, of course, initially pressure exerted by the feed solution pressure less its pressure drop through the membrane in cartridge 88 while producing purified water. As the pressure in storage tank 62 rises, the pressure differential, which is the driving force across the membrane in cartridge 64, decreases and osmotic efficiency decreases. It is advantageous therefore, to shut off the feed solution supply to reverse osmosis module 64 before the pressure differential across the membrane reaches too low a value caused by high pressure on the purified water side. Thus, the feed solution supply will be shut off when the pressure in the purified water storage tank 64 reaches a predetermined pressure higher than the predetermined lower pressure in the storage tank 62 at which the feed solution supply to module 64 is restored.

There may be times during operation of the reverse osmosis system of this invention that excess withdrawal of purified water from the storage container will cause the pressure of the purified water to drop substantially below the turn-on pressure for the membrane module. This will in no way affect the automatic operation of the system since the pressure of purified water in the storage container will continue to maintain the control valve in turn-on position until the storage pressure has again reached the shut-off pressure. If the output of the membrane module is relatively small, it obviously may not be able to keep up temporarily with extraordinarily heavy purified water withdrawals.

The system of this invention is advantageous in providing a pressure lag between predetermined storage tank pressures for turn-on and shut-off of the feed solution supply to the semipermeable membrane module. This results in a range of pressures between which pressurized purified water can be supplied and operation of the semipermeable membrane module shut down when its production is not at that time needed. Shutting down module operation for such periods will save an appreciable amount of water which would otherwise be wasted by continual flow of feed solution into the semipermeable membrane module, and possibly by discard of overflow purified water from the purified water storage tank.

It will be noted that the purified water pressure for shut-off of feed water flow is a predetermined proportion of the feed water pressure and that the restoration of feed water flow pressure is less than and a proportion of the shut-off pressure. Thus, a residual proportion of the feed water supply pressure is always present to maintain adequate pressure drop across the semipermeable membrane for efficient osmotic action and production of purified water. The predetermined proportions and relationships between the pressures at which feed water flow is shut off and restored are of course set and maintained over a range of feed water supply pressures by the piston area relationships in the automatic control valve.

I claim:

1. A reverse osmosis water purification system comprising a module containing a semipermeable membrane and having an inlet for introduction of pressurized feed water thereinto, means for releasing concentrate from said module, means for transferring purified water produced by said module into a storage container and for maintaining said purified water in said storage container under elevated pressure, means for dispensing purified water from said container, and an automatic valve for controlling the introduction of pressurized feed water into said inlet of said module thereby to regulate the pressure of the purified water under elevated pressure in said storage container, in which the improvement comprises:

a. said automatic valve comprising a body having a first internal cavity having a movable seal spanning its effective cross sectional area and having a connection above said movable seal communicating with said storage container;

b. said body having a central internal cavity communicating with said inlet for introducing pressurized feed water into said module, and having a movable seal spanning its effective cross sectional area operatively connected to said movable seal spanning said first internal cavity, the effective cross sectional area of said central internal cavity being less than the effective cross sectional area of said first internal cavity;

c. said body having a third internal cavity connected to a supply of pressurized feed water for said module and having an opening leading to said central internal cavity, said opening being of area smaller than the effective cross sectional area of said central cavity, and a movable seal operatively connected to the movable seal in said central internal cavity and adapted to close the opening leading from said third internal cavity to said central internal cavity when the pressure above said movable seal in said first internal cavity is above a first predetermined pressure and adapted to open the opening leading from said third internal cavity to said central internal cavity when the pressure above said movable seal in said first cavity is below a second predetermined pressure which is below said first predetermined pressure.

2. A valve according to claim 1, in which said first cavity in the body of said valve is near one end thereof, and said central cavity is between said first cavity and said third cavity is near the other end of said body.

3. A valve according to claim 1, in which the cross sectional area of the said seal spanning the said central cavity is from one-third to two-thirds of the cross sectional area of the said seal spanning the first cavity, and the cross sectional area of the said opening of the said third cavity is from one-half to slightly less than the cross sectional area of the said seal spanning the said central cavity.

4. A valve according to claim 1, in which a unitary double step piston has a large end forming a movable seal in said first cavity, a central section forming a movable seal in said central cavity, and a small end forming a movable seal to open and close the opening of said third cavity into and from communication with the said central cavity.

5. A valve according to claim 4, in which the large end of said step piston has a resilient O-ring slidably sealing it to the interior wall of said first cavity, the central section of said piston has a resilient O-ring slidably sealing it to the interior wall of said central cavity, and said small end has a resilient O-ring slidably sealing it to the interior wall of said third cavity when said piston is in position to close the opening of said third cavity from communication with said central cavity.

6. A reverse osmosis water purification system according to claim 1, in which the said automatic valve shuts off the flow of pressurized feed solution to said module when the pressure of purified water in said storage container is greater than a first pressure which is a predetermined proportion between one-third and two-thirds of the pressure of said pressurized feed solution, and restores flow of pressurized feed solution when the pressure of purified water in said storage container is less than a second pressure which is lower than said first predetermined pressure.

7. A reverse osmosis water purification system according to claim 6, in which said automatic valve restores flow of pressurized feed solution when the pressure of purified liquid in said storage container is from one-half to slightly less than said pressure which is a predetermined proportion of the pressure of said pressurized feed solution.

* * * * *